United States Patent
Cardenas-Valencia et al.

(10) Patent No.: US 7,767,323 B1
(45) Date of Patent: Aug. 3, 2010

(54) MICROBIAL FUEL CELL

(75) Inventors: Andres M. Cardenas-Valencia, Tampa, FL (US); Michelle L. Cardenas, Tampa, FL (US); Larry Langebrake, Seminole, FL (US)

(73) Assignee: University of South Florida, Tampa, FL (US)

( * ) Notice: Subject to any disclaimer, the term of this patent is extended or adjusted under 35 U.S.C. 154(b) by 230 days.

(21) Appl. No.: 11/959,981

(22) Filed: Dec. 19, 2007

Related U.S. Application Data

(60) Provisional application No. 60/870,656, filed on Dec. 19, 2006.

(51) Int. Cl.
H01M 8/16 (2006.01)
(52) U.S. Cl. .......................................... 429/2
(58) Field of Classification Search ............... 429/2
See application file for complete search history.

(56) References Cited

U.S. PATENT DOCUMENTS

| | | | |
|---|---|---|---|
| 3,305,399 | A | 2/1967 | Davis |
| 5,976,719 | A | 11/1999 | Kim et al. |
| 6,270,649 | B1 | 8/2001 | Zeikus et al. |
| 6,528,466 | B1 * | 3/2003 | Lan et al. ............... 510/191 |
| 2002/0122980 | A1 * | 9/2002 | Fleischer et al. ........ 429/213 |
| 2003/0087141 | A1 | 5/2003 | Sun et al. |
| 2006/0216223 | A1 * | 9/2006 | DiMascio ................ 423/477 |

OTHER PUBLICATIONS

Bond, D.; Lovely, D. 2003. Electricity production by Geobacter sulfurrenducens attached to electrodes. Applied and Environmental Microbiology. 69: 1548-1555.
Ieropoulos, I.; Greenman, J.; Melhuish, C.; Hart, J. 2005. Comparative study of three types of microbial fuel cell. Enzyme and Microbial Technology. 37: 238-245.
Grzebyk, M.; Pozniak, G. 2005. Microbial fuel cells (MFCs) with interpolymer cation exchange membranes. Separation and Purification Technology. 41:321-328.
Tartakovsky, B.; Guiot, S.R. 2006. A comparison of air and hydrogen peroxide oxygenated microbial fuel cell reactors. Biotechnology Progress. 22: 241-246.
Liu, Z.D.; Lian, J.; Du, Z.W.; Li, H.R. 2006. Construction of sugar-based microbial fuel cells by dissimilatory metal reduction bacteria. Chinese Journal of Biotechnology. 22: 131-137.
Logan, B.; Murano, C.; Scott, K.; Gray, N.; Head, I. 2005. Electricity generation from cysteine in a microbial fuel cell. Water Research. 39: 942-952.
Bond, D.; Holmes, D.; Tender, L.; Lovely, D. 2002. Electrode-reducing microorganisms that harvest energy from marine sediments. Science. 295: 483-485.
Rabaey, K.; Boon, N.; Hofte, M.; Verstraete, W. 2005. Microbial phenazine production enhances electron transfer in biofuel cell. Environmental Science and Technology. 39: 3401-3408.
Min, B.; Cheng, S.; Logan, B. 2005. Electricity generation using membrane and salt bridge microbial fuel cells. Water Research. 39: 1675-1686.
Tender, L.; Reimers, C.; Stecher III, H.; Homes, D.; Bond, D.; Lowy, D.; Pilobello, K.; Fertig, S.; Lovely, D. 2002. Harnessing microbial generated power in the seafloor. Nature Biotechnology. 20: 821-825.
Delong, E.; Chandler, P. 2002. Power from the Deep. Nature Biotechnology. 20: 788-789.
Shukla, A.K.; Suresh, P.; Berchmans, S.; Rajendran, A. 2004. Biological fuel cells and their applications. Current Science. 87: 455-468.
Shantaram, A.; Beyenal, H.; Raajan, R.; Veluchamy, A.; Lewandowski, Z. 2005. Wireless sensors powered by microbial fuel cells. Environmental Science and Technology. 39: 5037-5042.
Zhang, E.; Xu, W.; Diao, G.; Shuang, C. 2006. Electricity generation from acetate and glucose by sedimentary bacterium attached to electrode in microbial-anode fuel cells. Journal of Power Sources. xx: xxx-xxx.
Reimers, C.E.; Girguis, P.; Stecher III, H.A.; Tender, L.M.; Ryckelynck, N.; Whaling, P. 2006. Microbial fuel cell energy from an ocean cold seep. Geobiology. 4: 123-136.

* cited by examiner

*Primary Examiner*—Patrick Ryan
*Assistant Examiner*—Ladan Mohaddes
(74) *Attorney, Agent, or Firm*—Jeremy Spier; Robert Varkonyi; Smith & Hopen, P.A.

(57) ABSTRACT

A modified microbial fuel cell with a halogen salt or salt water oxidizer. The fuel cell is a batch cell, but flow-through cell embodiments are also envisioned. The cathode and anode are separated by a cation exchange membrane or saline bridge. The anode contains microorganisms in media or various water bed sediments. The cathode contains water and a halogenated salt oxidizer. The fuel cells operated continuously for over 3 months, providing approximately 10 times more power than those in the current literature for batch cells.

7 Claims, 2 Drawing Sheets

MICROBIAL FUEL CELL

CROSS REFERENCE TO RELATED APPLICATION

This application claims priority to currently pending U.S. Provisional Patent Application No. 60/870,656, entitled "Microbial Fuel Cell", filed on Dec. 19, 2006, the contents of which are herein incorporated by reference.

GOVERNMENT INTEREST

This invention was made with Government support under Grant No. DASG60-00-C-0089, awarded by Special Operations Command (SOCOM). The Government therefore has certain rights in the invention.

FIELD OF INVENTION

This invention relates to microbial fuel cells. Specifically, the invention relates to using halogen salt oxidizers to increase the electrical output of microbial fuel cells.

BACKGROUND OF THE INVENTION

The availability of energy to power instruments/devices or equipment for different purposes is very important. For remote or unattended applications batteries or fuel cells are needed. The choice of power source for instruments and communication networks are dependent on the environment and power needs of the device. For equipment that is placed in remote locations, such as at the bottom of the ocean, or intended for long term deployment, power sources that run for a long duration are advantageous.

Work on fuel cells began in the early 19th century. Whereas batteries release energy stored in a closed system, fuel cells are energy conversion systems, transferring electricity from replenishing sources of external fuel. Fuel cells may produce electricity continuously if provided a sufficient flow of the external fuel, as opposed to batteries.

Microbial fuel cells are being developed to provide long-term power for a variety of applications for remote sensing and long duration studies. The cells are an attractive choice for this application due to the longevity of the cells. Microbial fuel cells convert chemical energy to electrical through a catalytic reactions, using microorganisms. The cells are comprised of two chambers separated by a cation exchange membrane. The anode chamber contains microorganisms in a microorganism-specific media. The media is a fed into the fuel cell where microorganisms catabolize the compound under anaerobic conditions producing carbon dioxide, protons, and electrons.

The second chamber is a cathode chamber, containing deionized (D.I.) water with an oxidizer. Typical microbial fuel cells use potassium ferricyanide/potassium hydrogen phosphate, oxygen, hydrogen peroxide, manganses dioxide, or copper chloride as the oxidizer.

Electrons gained from this process enter an electrical circuit, providing current. One drawback of microbial fuel cells is the low power output, due in part to electron transfer efficiency. Previous modifications to address this shortcoming have included electron mediators or mediatorless microbes. Redox mediators couple the electron reduction, through oxidative metabolism in a microbe, to the reduction of the electron acceptor on the cathode. (Zeikus, et al., U.S. Pat. No. 6,495,023, columns 3 and 4).

However, even with the advances made in microbial fuel cells, the process still produces only small electrical currents, far below the energy production of other fuel cells. What is needed is a more efficient electron transfer device.

SUMMARY OF THE INVENTION

The microbial fuel cells are comprised of two chambers separated by a cation exchange membrane. The anode chamber contains microorganisms in a media, and the cathode chamber contains D.I. water with one of various oxidizers. The fuel cell is a batch cell, but flow-through cell embodiments are also envisioned. The cathode chamber and anode chamber are separated by either a cation exchange membrane or saline bridge. Nafion 117 (DuPont) and CMI-7000 (Membranes International Inc.) have been used as the cation exchange membrane. In other embodiments, a potassium chloride-agar saline bridge was utilized to transfer cations.

The anode chamber contains microorganisms in a media. Microgoranisms may include *Escherichia coli*, *Geobacter sulfurrenducens*, *Geobacter metalliruducens*, *Rhodoferax ferriricudens*, *Pseudomonas aeruginos*, and *Desulfovibrio desulfuricans*. The mixed microorganisms in various water bed sediments have also been utilized in the anodic chamber. The microorganisms are suspended in media appropriate to the selected microorganism. Appropriate media includes Luria-Bertani (LB) media, carbohydrates, such as glucose or acetate, Tartoff-Hobbs broth (Terriffic Broth), LBM media, GTE solution, SOB media, SOC media, minimal medium for *E. Coli*, or other. Electron mediators, such as [9,10-anthraquinone-2,6-disulfonic acid disodium salt (AQDS), safranine O, resazurin, methylene blue, and humic acids, can be used to aid in the electron transfer process, as known in the art.

The cathode chamber contains water and an oxidizer. Typical cells use oxygen, potassium ferricyanide/potassium hydrogen phosphate, hydrogen peroxide, manganese dioxide, or copper chloride, the copper cathode, as an oxidizer. These chemicals are coupled with various cathodes (graphite cloth or rods, or metals—platinum or palladium). The present invention uses halogenated salts as the oxidizer in the cathode. Examples of useful halogenated salts are lithium fluoroantimonate(V) ($LiSbF_6$), $LiClO_4$, lithium bis(oxalato)borate ($LiB(C_2O_4)$), lithium triflate ($LiCF_3SO_3$), $LiN(SO_2CF_3)_2$, lithium hexafluorophosphate ($LiPF_6$), lithium tetrafluoroborate ($LiBF_4$), lithium hexafluoroarsenate monohydrate ($LiAsF_6$), $LiCF_3SO_3$, $Li_2B_{10}C_{10}$, and $Li_2B_{10}F_{10}$. Further suitable lithium salts include chelated orthoborates and chelated orthophosphates (collectively, hereinafter, "ortho-salts"). Exemplary ortho-salts include lithium bis(oxalato)borate (LiBOB), lithium bis(malonato) borate (LiBMB), lithium bis(difluoromalonato) borate (LiBDFMB), trichloro isocyanuric acid and sodium dichloro isocyanuric acid, lithium (malonato oxalato) borate (LiMOB), lithium (difluoromalonato oxalato) borate (LiDFMOB), lithium tris(oxalato)phosphate (LiTOP), and lithium tris (difluoromalonato)phosphate (LiTDFMP).

In one embodiment, fuel cell is powered by a mixed population of microbes in marine sediment. The fuel cell uses the marine sediment as the anode "chamber," with the release of electrons occurring in the sediment itself. The electrons are collected by the anode, about 10 cm below the surface of the sedimentation, and transferred to an electrical circuit. The cation produced by the microbe reduction passes through the sediment, which acts as a cation exchanger, to the cathode chamber, filled with a halogen salt oxidizer, which oxidizes the cation to form water.

The fuel cell chambers use a cathode and an anode made of graphite cloth, graphite rod, carbon fiber veil, carbon mesh, carbon cloth, or platinum- or palladium-covered metal.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The microbial fuel cell of the current invention is preferably comprised of two chambers separated by a cation exchange membrane. The anode chamber is a closed, or batch, system and contains a non-renewing suspension of microorganisms in media.

Figure 1:
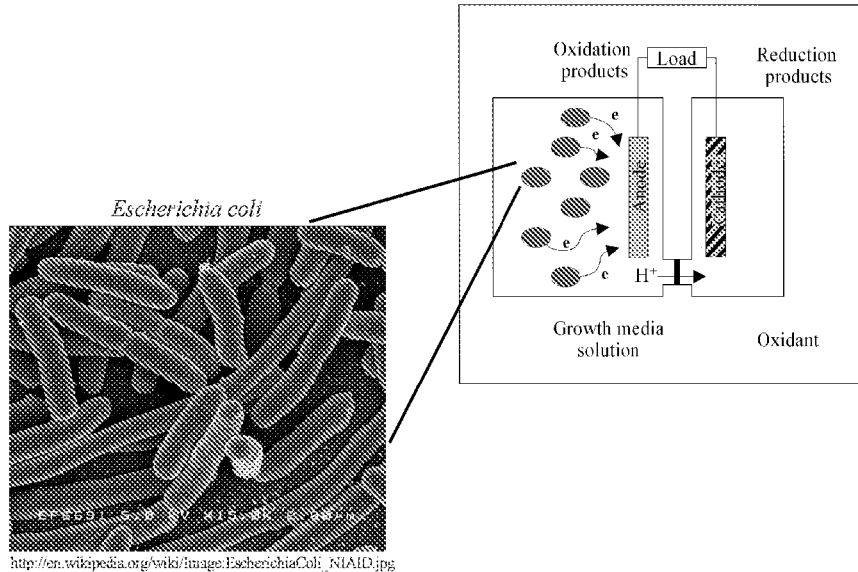
FIG. 1 is a schematic of the anoxic microbial fuel cell using a batch fuel cell. The use of strong oxidizers in the cathode enhances power output as compared to traditional cells. The fuel cell shows *Escherichia coli* acting as the electron-producing microbe. The cathode and anode are separated by a cation exchange membrane, allowing only protons to pass through to the cathode. A flow through fuel cell is shown, but batch fuel cells are also envisioned.
Figure 2:
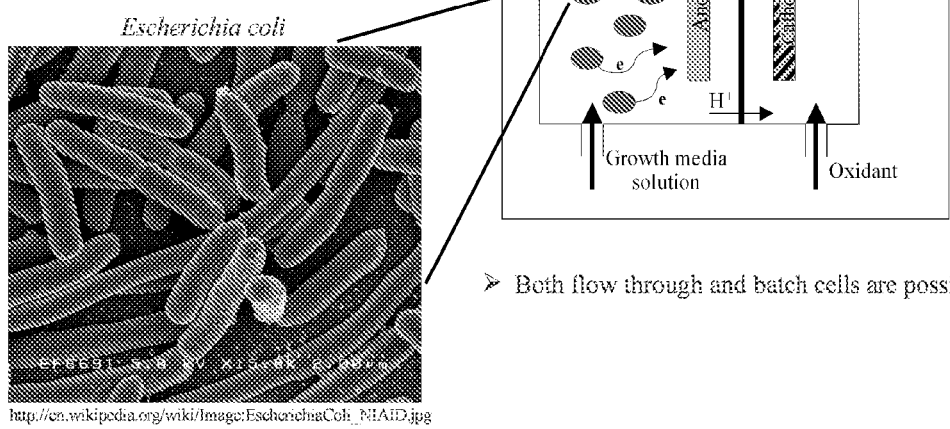
FIG. 2 depicts an encased reagent flow through microbial fuel cell. The use of strong oxidizers in the cathode enhances power output as compared to traditional cells. The fuel cell shows *Escherichia coli* acting as the electron-producing microbe. The cathode and anode are separated by a cation exchange membrane, allowing only protons to pass through to the cathode. A flow through fuel cell is shown, but batch fuel cells are also envisioned.

The, batch fuel cell, seen in FIG. 1, comprises an anode chamber containing *E. coli* (DH5α) in LB broth media. The LB broth is prepared as specified on the bottle, 25 g in 1 L and autoclaved for 15 minutes at 121° C. A cation exchange made of Nafion-117 (DuPont) or CMI-7000 (Membranes International Inc.) are employed. The cathode chamber contains deionized water and a halogenated salt oxidizer. The exemplary fuel cells employed trichloro isocyanuric acid or sodium dichloro isocyanuric acid. FIG. 2 shows an alternative embodiment, where the fuel cell is a flow through cell.

The anode and cathode are made from carbon mesh, with an area of about 18 cm$^2$. The cathode also has a platinum or palladium coating on the electrode, which acts as a catalyst.

Figure 3:
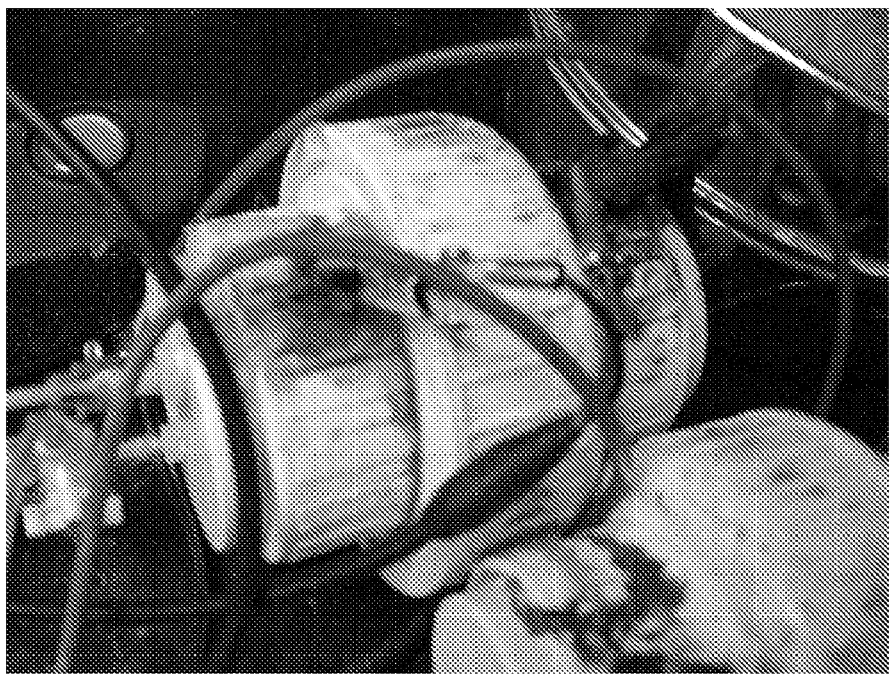
FIG. 3 is a diagram of a fuel cell design using marine sediment.
Figure 4:
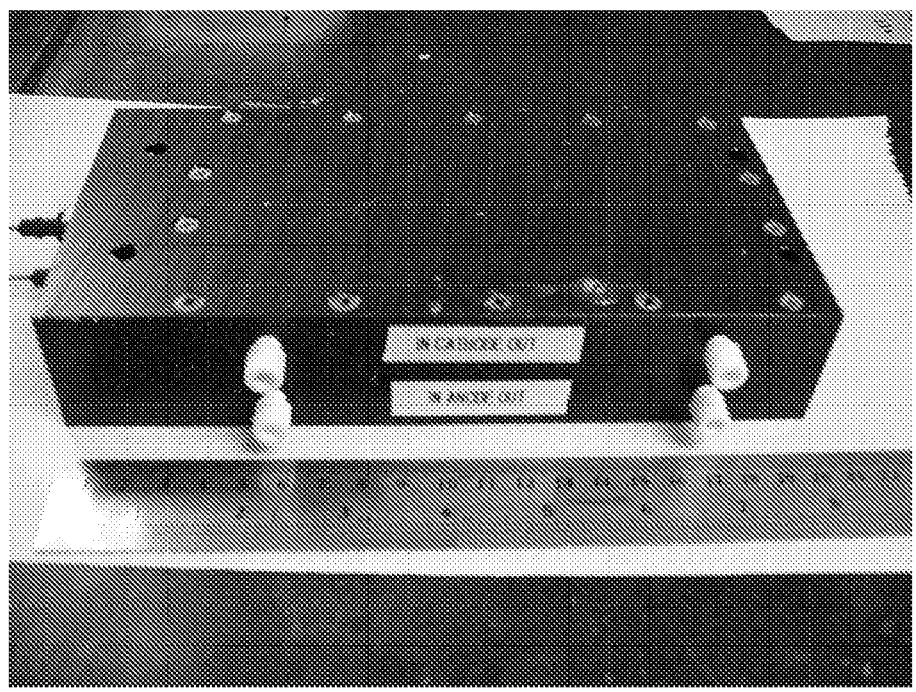
FIG. 4 is a photograph of the prototype fuel cell design, which uses marine sediment.

The fuel cells, shown after testing in FIG. 3, operated continuously for over 3 months, providing around 260 mW/m$^2$ and between 0.4V-0.6V with a 1000Ω load. This is a factor of 10 times greater than those in the current literature for batch cells. Another example of future cell microbial fuel design employing the current invention is shown in FIG. 4.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A microbial fuel cell, comprising:
   a first chamber filled with a microorganism suspended in a media;
   a cation exchange membrane in mechanical contact with the first chamber on a first interface edge on said cation exchange membrane;
   a second chamber filled with deionized water and a halogen salt oxidizer in mechanical contact with the cation exchange membrane on a second interface edge of said cation exchange membrane;
   the halogen salt oxidizer being selected from the group consisting of trichloro-isocyanuric acid and sodium dichloro isocyanuric acid;
   an anode in mechanical contact with the first chamber; and
   a cathode in mechanical contact with the second chamber.

2. The microbial fuel cell of claim 1, further comprising: the microorganism being selected from the group consisting of *Escherichia coli, Geobacter sulfurrenducens, Geobacter metalliruducens, Rhodoferax ferririecudens, Pseudomonas aeruginos*, and *Desulfovibrio desulfuricans*.

3. The microbial fuel cell of claim 1, further comprising: the media being selected from the group consisting of Luria-Bertani media, acetate, lactose, glucose, fructose, maltose, ribose, Tartoff-Hobbs Broth, LBM media, GTE solution, SOB media, SOC media, minimal medium for *E. Coli*, lake sedimentation, river sedimentation, and seafloor sedimentation.

4. The microbial fuel cell of claim 1, further comprising: the cathode and anode being made of a material selected from the group consisting of graphite rods, carbon fiber, carbon mesh, graphite cloth, platinum coated metals, and palladium coated metals.

5. The microbial fuel cell of claim 1, further comprising: the first chamber selected from the group consisting of a closed circuit, a batch fuel cell, an open circuit, and a flow through fuel cell.

6. The microbial fuel cell of claim 1, further comprising: an electron mediator being added to the microorganism.

7. The microbial fuel cell of claim 1, further comprising: the cation exchange being selected from the group consisting of Nafion-117, CMI-7000, a saline bridge, potassium chloride/agar, a physical barrier, and sediment.

* * * * *